United States Patent

Becker et al.

[15] 3,637,920

[45] Jan. 25, 1972

[54] METHOD AND SYSTEM FOR CORRECTING COLOR ERRORS IN THE TELEVISION-SCANNING OF COLOR FILMS

[72] Inventors: Werner Becker, Erfelden; Hans Horneff, Darmstadt, both of Germany

[73] Assignee: Fernseh GmbH, Darmstadt, Germany

[22] Filed: July 31, 1970

[21] Appl. No.: 59,913

[30] Foreign Application Priority Data

Aug. 2, 1969 Germany ......................P 19 39 515.4

[52] U.S. Cl. ........................178/5.2, 178/6.7 A, 178/5.4 CD

[51] Int. Cl. ........................................................H04n 9/48

[58] Field of Search ............178/5.4 CR, 6.7 A, 5.2, DIG. 28

[56] References Cited

UNITED STATES PATENTS

| | | | |
|---|---|---|---|
| 2,947,810 | 8/1960 | Horsley | 178/6.7 A |
| 3,005,042 | 10/1961 | Horsley | 178/6.7 A |

*Primary Examiner*—Robert L. Griffin
*Assistant Examiner*—John C. Martin
*Attorney*—Littlepage, Quaintance, Wray & Aisenberg

[57] ABSTRACT

A system for correcting color errors in color films for television transmission. Machine-readable scene markers are placed on the film for each scene, the film is initially screened, being stopped at each marker, and the appropriate correction factors are derived and recorded for each scene, whereby the recorded correction factors are used for automatically correcting the color errors when the film is subsequently run for transmission.

20 Claims, 18 Drawing Figures

Inventors:
Werner Becker
Hans Horneff

Littlepage, Quaintance, Wray & Aisenberg
by
Attorneys

Inventors:
Werner Becker
Hans Horneff
by
Littlepage, Quaintance, Wray & Aisenberg
Attorneys Inventors:
Werner Becker
Hans Hornelf
by
Littlepage Quaintance Wray & Aisenberg
Attorneys Inventors:
Werner Becker
Hans Horneff
Littlepage, Quaintance, Wray & Aisenberg by
Attorneys

METHOD AND SYSTEM FOR CORRECTING COLOR ERRORS IN THE TELEVISION-SCANNING OF COLOR FILMS

BACKGROUND OF THE INVENTION

1. Field of the Invention

The invention relates to a method and arrangements for correcting color errors in the television scanning of color films.

Color films are frequently of different color quality, and variations may even occur during a single film. Thus it is necessary to provide color television film-transmitting systems with color film scanners and color-correction arrangements, whose controls must sometimes be frequently operated.

2. Description of the Prior Art

According to the method previously practiced, the correction of color errors was made during transmission by arranging for a qualified person to monitor the television picture to be transmitted and to adjust, when necessary, the color-correction control device. However this method is compromised by the same defects as a so-called live transmission, i.e., defective color-matching can be corrected only with some delay because the defective signals have already been radiated for a certain time and have therefore reached the viewers. Moreover, in successive transmissions of the same film, the color-matching must be controlled each time.

SUMMARY OF THE INVENTION

A purpose of the present invention is to offer a method whereby the above-mentioned disadvantages are eliminated.

The invention is characterized by the feature that markings are applied to the color films, and upon passage of the color films through the scanning device, the markings influence an information carrier. First of all, the color films are observed, and according to the visual impression thus obtained, the transmission characteristics of a transmission means connected in the path of the signals are adjusted to cause a reduction in the color errors. Simultaneously, these correction factors are stored upon the information carrier. Later, when the films are played back, the correction factors are extracted from the information carrier and are delivered to the transmission means in such a manner that the transmission characteristics thereof are influenced to cause a reduction in the color errors.

The primary advantage of the invention is that, in the television transmission of the color film, the color correction, having once been made, is automatically effected for each showing of the film. Thus the correction takes place in an optimum manner from the commencement of each scene. When transmitting the film no additional personnel are required because, after the correcting factors have been recorded upon the information carrier, a color film can be repeatedly reproduced with the recorded correction.

A further development of the invention provides that the correction values are adjusted as analog values, preferably electrical voltages, which then are converted into digital signals are are preferably recorded upon punched tape.

This development of the invention combines in a special manner the advantages of digital recording, such as proof against errors and exact reproducibility, with the advantages of continuously variable control elements.

BRIEF DESCRIPTION OF THE DRAWINGS

The invention will now be explained in more detail with reference to the FIGS. of the accompanying drawings, wherein.

Similar components in the separate figures are provided with the same reference characters.

DESCRIPTION OF THE PREFERRED EMBODIMENTS

Figure 1:
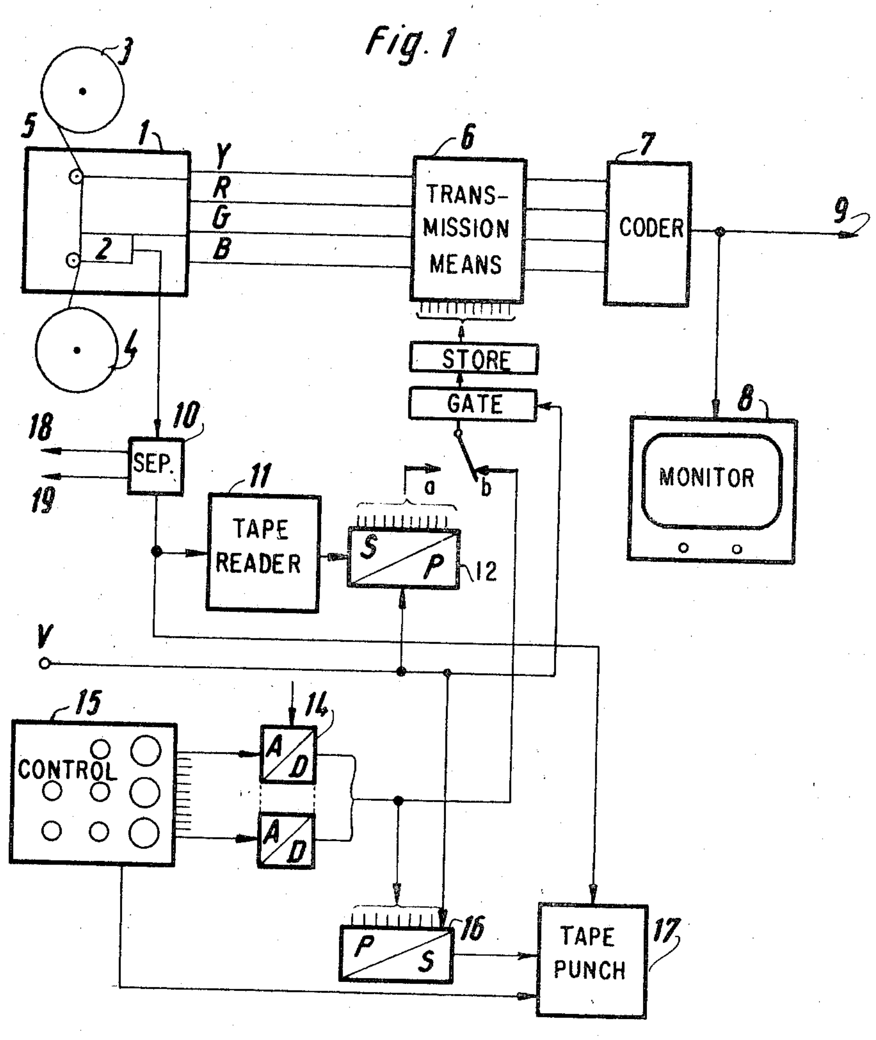
FIG. 1 is a schematic block diagram of a system for carrying out the invention.

In FIG. 1 the reference 1 indicates a color film scanner, wherein a color film 5 is scanned and electrical signals Y, R, G and B are produced. These signals are delivered through a transmission means 6 to a coder 7. To the output of the coder 7 there is connected a color television monitor 8.

Furthermore the color film scanner contains a device 2 which delivers electrical signals when a marking upon the film traverses the scanner.

Figure 2:
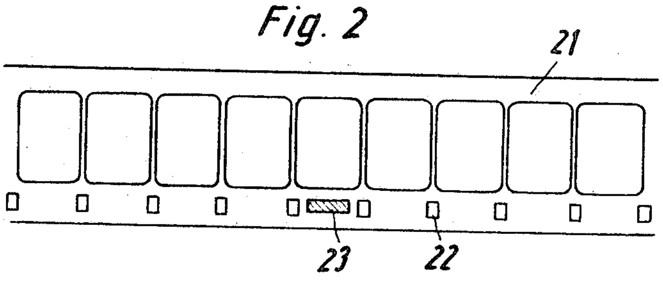
FIG. 2 shows, as an example, a 16 mm. film with a marking according to the invention.

Such a marking 23 is represented in FIG. 2. It is situated between two perforation holes 22 of the film 21. In FIG. 2 there is represented a 16 mm. film. However, it is also possible to apply corresponding markings to films of other format, for example upon the normal films. The marking 23 itself consists of a reflecting, electrically conductive, coating.

In the device 2 there may be an electrical contact which is closed by the marking, or there may be an optical-electrical transducer, which converts into electrical signals the light originated from a light source and reflected by the marking. However, on account of its greater reliability and freedom from the necessity of supervision, the optical-electrical transducer is in general to be preferred.

The signals delivered by the device 2 (FIG. 1) are taken to a separator 10, which upon the appearance of only one marking, that is to say upon the delivery of only one electrical pulse, transfers the latter to a punched tape reader 11 and a tape perforator 17.

Before actually transmitting the color film it is observed upon the monitor 8. At the beginning of each scene the film scanner is held by the markings upon the color film. By observation of the monitor picture the particular scene is judged in respect of its color reproduction. Any color errors which are present are compensated for by operating the appropriate adjusting elements at the control apparatus 15.

The output voltages from the control apparatus, referred to in the following as correction factors, influence the transmission characteristics of the transmitting means 6. In this respect there will particularly come into consideration the amplification, that is to say finally the maximum amplitude of the signals R, G and B as well as their gradation and black values. If necessary it will also be possible to influence the black value as well as the gradation of the luminance signal Y. A further possibility of influencing the color impression of the reproduced pictures is by using the so-called chroma control, wherein the color value signals R, G and B are adjusted among each other in the same sense, while the luminance signal Y is varied in the opposite sense so that the overall amplitude remains unchanged.

In order to ensure that the effected adjustments are capable of being reproduced when desired, and at the same time to make possible an advantageous adaptation of the entire system to storage by means of punched tape, a further development of the inventive concept provides that the correction factors which are available in analog form at the outputs of the control desk are converted into digital signals. For this purpose analog-digital converters 14 are connected to the outputs of the control apparatus 15. It has been found that 63 stages suffice to give a sufficiently accurate adjustment so that the outputs of the analog-digital converter 6 may have six places. When making observation for the purpose of correction before transmitting the signals, the switch 13 is brought into the position *b* so that the digital signals arrive at the transmitting means 6, which, as will be further described, can be controlled by digital signals. The outputs of the analog-digital converter are at the same time connected to a parallel-series converter 16, which, by the use of a method known per se, brings the signals into a series form suitable for the perforator 17. After the adjustment of the correction factors has been brought about, the instruction to perforate is issued by the control apparatus 15. Thereafter the film 5 is transported to the beginning of the next scene and the punched tape is brought into the next position.

In the transmission of the color film, the punched tape is inserted in the reader 11 and the switch 13 is brought into the position *a*. At the beginning of each scene, the signals necessary for the correction of that scene are delivered from the punched-tape reader 11 to a series-parallel converter 12. The series-parallel converter also comprises, besides the converter system itself, a store which retains the correction signals up to the beginning of the next scene. Through the switch 13 the correction signals are delivered to the transmitting means 6, which correct the signals delivered by the color film scanner in the same way as was done in the preliminary observation. These corrected signals travel through the coder 7 and a switching point 9 for transmission.

By reason of the digital transmission of the correction factors and the transient variations thereby involved, disturbances will occur in the television picture unless special measures are employed when the correction factors are adjusted. It is the purpose of the circuit arrangements hereinafter described to prevent these disturbances.

According to a further development of the invention there is provided a known type of analog-digital converter 14, whose outputs are respectively connected to an intermediate store 102 through a respective gate circuit 101, which latter is conducting during the vertical blanking. The content of the intermediate store is therefore changed only during the vertical blanking so that during the picture trace no disturbances occur.

Figure 3:
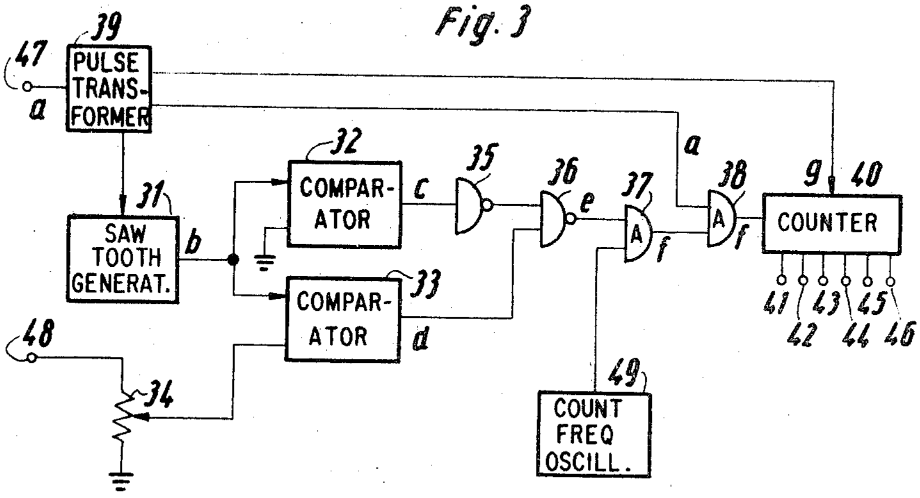
FIG. 3 shows schematically a practical example of an analog-digital converter according to the invention.

A further development of the invention includes an analog-digital converter which is synchronized by the vertical pulse, whereby an intermediate store is made superfluous. A first practical example of such an analog-digital converter is shown in FIG. 3. For explaining the function of the analog-digital converter according to FIG. 3, there are represented in FIGS. 4*a* to 4*g* the signals appearing at the positions of FIG. 3 indicated by similar characters *a* to *g*.

Figure 4:
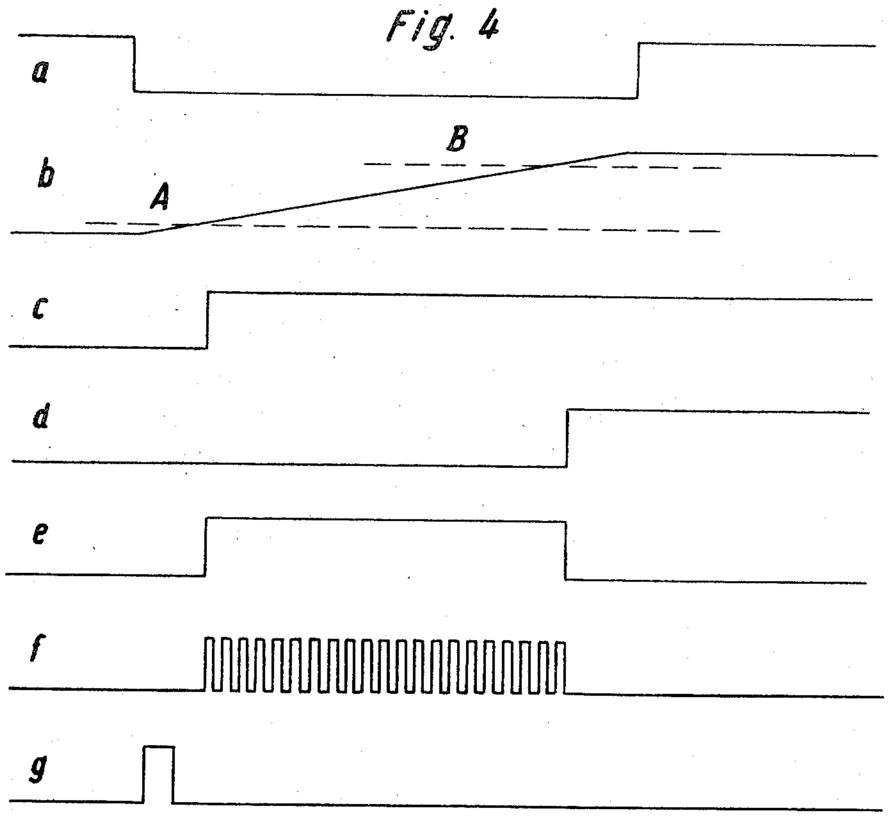
FIGS. 4*a*–4*g* show voltage-time diagrams of the signals appearing in the circuit arrangement according to FIG. 3.

In the circuit arrangement according to FIG. 3 a vertical-frequency pulse is delivered to the point 47, which pulse is shown in FIG. 4. Although in the practical example shown, vertical-frequency blanking pulse is used, it is possible nevertheless to use other vertical-frequency pulses, which are then brought into the required form in the pulse former 39 by delay action and pulse-transforming.

The vertical-frequency blanking pulse is taken from one side of the pulse transformer 39 to the sawtooth generator 31, which generates a voltage curve, which during the vertical-frequency blanking interval, is approximately linear with respect to time. This curve is represented by FIG. 4*b*.

The output voltage of the sawtooth generator 31 is taken to one input of each of the comparators 32 and 33. The other input of the comparator 32 is grounded, while to the other input of the comparator 33 is delivered a correction factor which can be adjusted by a potentiometer 34. The constant potential and the adjustable correction factor are respectively represented by dashed lines A and B in FIG. 4*b*.

The output voltage of each comparator swings from one to the other prescribed value as soon as the voltage at the one input of the comparator falls below or exceeds the voltage at the other input. The comparators may be Schmitt switches or may be operational amplifiers. The output voltages of the comparators are represented in the FIGS. 4*c* and 4*d*.

The time-spacing between the response of the comparators is of variable magnitude according to the adjusted correction factor. A pulse (line *e*) is formed by logic circuits 35 and 36 whose width corresponds to this time-spacing. This pulse is delivered to the input of an AND-circuit 37, while the other input of the latter is provided with the output voltage of a count-frequency oscillator 49. In the practical embodiment of the circuit arrangement according to FIG. 3, a counting frequency of 1 mHz. was selected.

The number of pulses delivered by the AND-circuit 37 (FIG. 4*f*) is a direct measure of the adjusted correction factor. The pulses are delivered to the counter 40, at the outputs 41 to 46 of which the correction factor is available in digital form.

At the beginning of each vertical-frequency blanking interval, the counter 40 is brought into the zero position by a pulse (FIG. 4*g*) delivered from the pulse transformer 39. Because the sawtooth output voltage of the generator 31 cuts the constant potential and the correction factor for a second time during the picture forward trace, and because spurious measurements would result therefrom, a further AND-circuit 38 is interposed in the lead for the pulses to the counter 40. This AND circuit conveys the pulses to the counter only during the blanking interval, for which purpose a further vertical-frequency pulse (FIG. 4*a*) is formed by the pulse transformer 39.

According to FIG. 1 an analog-digital converter is necessary for each of the correction values. In a practical embodiment of the arrangement 12 analog-digital converters were therefore provided. Nevertheless, it was not necessary to repeat all the components of the circuit according to FIG. 3 12 times. The pulse transformer 39, the sawtooth generator 31, the counting frequency oscillator 49, and the comparator 32 were each required only once.

Figure 5:
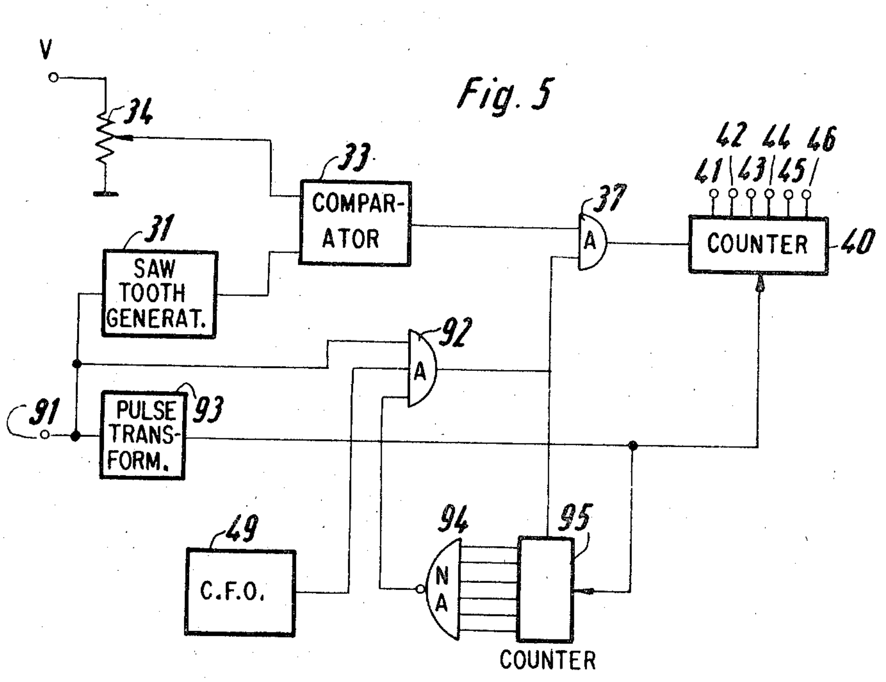
FIG. 5 is a schematic diagram of another analog-digital converter.

FIG. 5 shows an analog-digital converter having only one comparator 33. Like the circuit arrangement according to FIG. 3, a correction factor is adjusted by means of a potentiometer 34 situated in the control apparatus, the potentiometer being provided with a constant voltage, and the correction value being delivered to the input of comparator 33. Again, like the circuit arrangement according to FIG. 3, a voltage is delivered by the sawtooth generator 31 to the other input of the comparator, this voltage having a linear time relationship during the vertical blanking gap. Nevertheless, in the circuit arrangement according to FIG. 5, no further comparator is employed in order to determine the cutting point of the sawtooth voltage with the constant potential. On the contrary, the vertical-frequency blanking pulse delivered at point 91 is applied to an AND-circuit 92, which, together with the counting-frequency oscillator 49, the counter 95 and the NAND-circuit 94, has the effect that to the one input of the AND- circuit 37, 63 counting pulses are delivered from the beginning of the vertical-frequency blanking gap. Of these counting pulses a portion is admitted which varies according to the adjusted correction value, that is to say according to the position of the cutting point between the correction value and the sawtooth voltage, so that the number of pulses arriving at the counter 40 is proportional to the correction value and is available in coded form at the outputs 41 to 46 of the counter 40. Again, like the circuit arrangement according to FIG. 3, the counter is brought into the zero position at the beginning of the vertical-blanking gap, for which purpose a suitable pulse is derived from the pulse former 93.

By reason of the fact that only 63 counting pulses are delivered to the AND-circuit 37, the counter 40 is not able to count further than 63. Because the number of places provided by the counter is limited to six, it would be possible, in the absence of this additional safeguard, for the counter to arrive in the zero position at a further pulse, the result of which would be that a false adjustment value would be delivered to the transmission means 6 (FIG. 1). In order to prevent this happening in the circuit arrangement according to FIG. 3, it is necessary either to adjust very precisely the maximum obtainable correction value or, if this should not be possible, to forego a portion of the range of adjustment for the purpose of obtaining reliability.

The count-frequency oscillator 49 continuously delivers counting pulses which are delivered to the one input of the three-input AND-ciruit 92. The NAND-circuit 94, having six inputs, delivers a "Null" signal when counter 95 has reached the 63rd position. By this means the further transfer of the count pulses through AND-circuit 92 is suppressed so that the counter 95 is also stopped. At the beginning of the subsequent vertical blanking gap, the counter 95 is brought into the zero position, and at the same time the AND-circuit 92 is again rendered conducting for the counting pulse by the vertical-blanking pulse at its third input, which is made possible at the same time in that the AND-circuit 94 delivers a "L" signal, this being caused by the zero position of the counter 95.

In the circuit arrangement according to FIG. 1, 12 correction values are provided. For this purpose the greater part of the circuit arrangement according to FIG. 5 can be common while it is necessary for only the potentiometer 34 (located in the control apparatus), the comparator 33, the AND-circuit 37 and the counter 40 to be provided for each of the correction values.

Furthermore, the markings applied to the film can be employed for the purpose of changing over from one strip to the next. For this purpose a signal is delivered from the separator 10 through the output 18, which upon the appearance of two closely succeeding markings sets into operation a second color film scanner. When three markings closely follow each other there will appear at the output 19 of the separator 10 a signal which causes the changeover and stops the first color film scanner.

Figure 6:
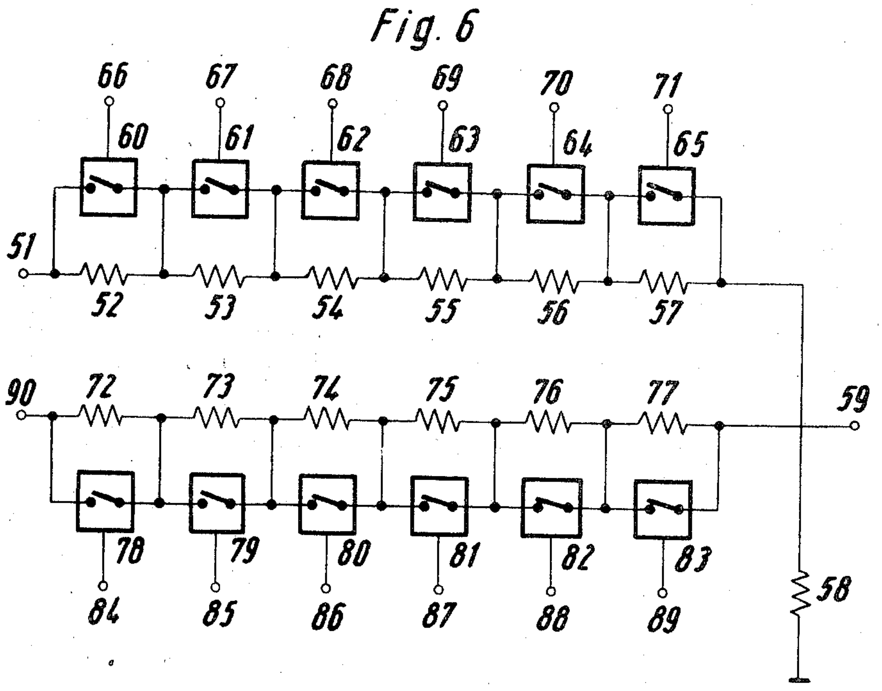
FIG. 6 is a schematic diagram of an amplitude and mixing control device contained in the transmission means.

FIG. 6 shows a practical example of an electronically controlled voltage divider, which is a part of the transmission means 9. The resistances 52 to 57 and the resistance 58 form a voltage divider, at whose input 51 there is applied the voltage which is to be influenced, and whose terminal 59 forms the output. The resistances 52 to 57 are each bridged over by an electronic switch. The electronic switches are controlled by digital signals applied to the terminals 66 to 71. The resistances 52 to 57 are dimensioned in such a manner that the closing or opening of a respective one of the switches brings about a variation in the transfer factor which in each case is double the magnitude of the next smaller variation. For example, a number of steps from 0.5 percent to 16 percent may be chosen, so that by any desired combination of the digital signals, it is possible to obtain a maximum damping of 31.5 percent in steps of 0.5 percent referred to the maximum transfer factor.

Such a voltage divider can be adopted, for example, for the adjustment of the amplification. By the addition of a series of resistances 72 to 77, which are likewise bridged over by electronic switches 78 to 83, there is obtained a so-called blending circuit, in which case then the resistance 58 is very large as compared with the resistances 52 to 57 and 72 to 77, and is, for example, the high input of an impedance transformer stage, and the mixing signals are derived from low ohmic sources for delivery to the terminals 51 and 90. If the digital signals are taken in a suitable manner to the terminals 66 to 71 and the terminals 84 to 89, then the series circuit located between the circuit points 51 and 59 operates in an opposite sense to the series circuit located between the points 90 and 59. This mixing circuit is adopted for the adjustment of the gradation by applying to the terminals 51 and 90, through a respective nonlinear amplifier signals which are distorted in opposite senses, and different components of these signals arrive at the output 59 depending upon the adjustment of the gradation controller.

Figure 7:
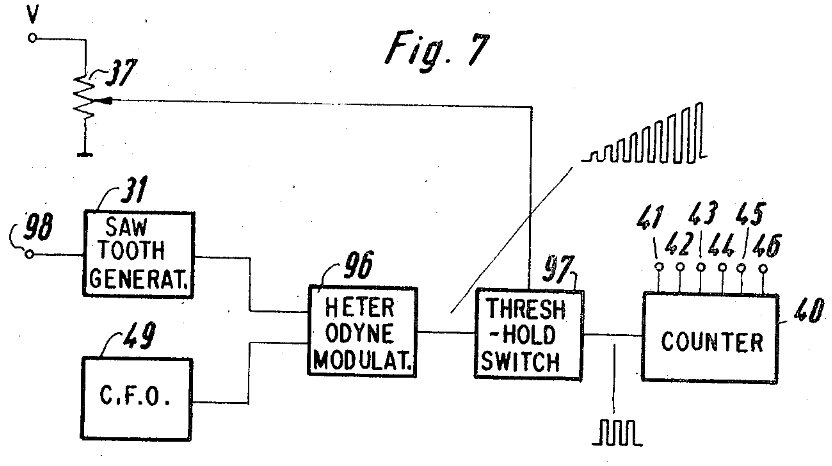
FIG. 7 is a schematic diagram of a third analog-digital converter.

A third analog-digital converter which operates during the vertical-frequency blanking interval is shown in FIG. 7. Vertical-frequency pulses are delivered to the point 98 and arrive at the sawtooth generator 31. Like the circuit arrangements according to FIGS. 3 and 5, the sawtooth generator forms a voltage which rises in a linear time manner during the vertical-frequency blanking interval. The output voltage of the sawtooth generator 31 is delivered to the heterodyne circuit 96. In this heterodyne circuit the output voltage of the counting frequency oscillator 49 is superimposed upon the sawtooth voltage. This superimposing operation may be effected, for example, in the following manner. The sawtooth voltage is blanked out by the output voltage of the counting frequency oscillator in such a manner that the output voltage of the heterodyne circuit exhibits a constant potential for each half-wave of the output voltage of the count frequency oscillator 49, and during the other half-waves maintains the available amplitude of the sawtooth voltage. The output voltage of the heterodyne circuit 96 therefore represents a series of pulses whose amplitude increases in a linear-time manner. The fact that in this case the crests of the pulses are not flat but also ascend in a linear time manner will have only a minor influence if the scanning condition is suitably chosen.

The function of the circuit arrangement according to FIG. 7 is not restricted to the above-described method of superimposing the voltages. It is possible also to perform a purely additive method of superimposition. By way of explanation it may be noted that the above-described method of superimposing the voltages according to the blanking principle can also be considered as a multiplicative method, if the two end values, between which the output voltage of the count frequency oscillator alternates, are considered to be in the one case zero and in the other case "one" or as a constant factor.

The sawtooth voltage having superimposed upon it the count-frequency pulses is delivered to a threshold value switch 97, whose threshold value is determined by the correction factor tapped off from a constant voltage V by the potentiometer 34. According to the adjustment of the correction factor more or less pulses arrive at the counter 40. Again, like the circuit arrangements according to FIG. 1 and 3, the digital signals appear at the outputs 41 to 46.

Figure 8:
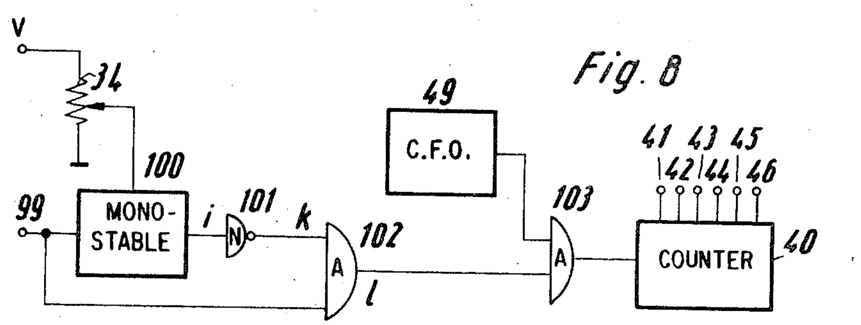
FIG. 8 is a schematic diagram of a fourth analog-digital converter.

A particularly simple circuit arrangement of an analog-digital converter is shown in FIG. 8. This operates again during the vertical-frequency blanking interval, and, in respect of linearity is, in certain circumstances slightly inferior to the previously described circuit arrangements. However, this nonlinearity is not a serious disadvantage in certain applications.

Figure 9:
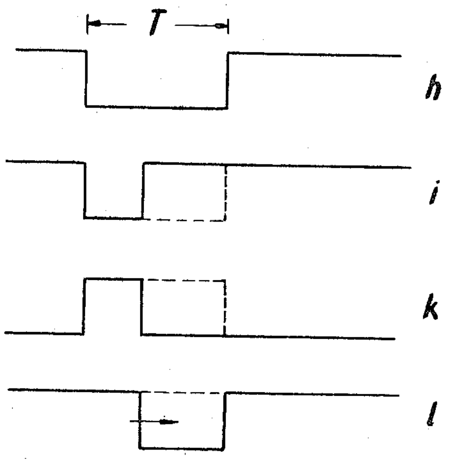
FIGS. 9*h*–9*l* show voltage-time diagrams of the pulses appearing in the circuit arrangement according to FIG. 8.

In the circuit arrangement according to FIG. 8 a vertical-frequency pulse is delivered at point 99. This pulse is represented in FIG. 9*h* as a voltage-time diagram. The pulse width T amounts to about 0.5 ms. The vertical-frequency pulse controls a monostable multivibrator, whose output voltage is represented in FIG. 9*i*. The width of this pulse, that is to say the duration of the unstable condition of the monostable multivibrator 100 is approximately dependent in a linear time manner upon the correction factor, which is adjusted by the potentiometer 34.

The adjustment range of the width of the output pulse of the monostable multivibrator 100 is likewise indicated in FIG. 9*i*. While the pulse represented by the unbroken line indicates the smallest adjustable width, the pulse with the greatest width is represented by dashed lines. This pulse proceeds through the NOT-circuit 101 to the input, indicated by *k*, of an AND-circuit 102 (See FIG. 9*k*). The NOT-circuit may also be omitted if the monostable vibrator 100 has a suitable inverted output. To the other input of the AND-circuit 102 there is delivered the pulse represented in FIG. 9*k*. The output 1 of the AND-circuit 102 then delivers the pulse represented in FIG. 9*l*, whose leading edge is variable as a function of the correction factor (indicated by an arrow).

If, for example, the width of the pulse appearing at point *i* or point *k* is adjusted to the greatest possible value, then no pulse will be available at the point 1. By the use of the logic circuits 101 and 102 the result is therefore achieved that a pulse may be continuously adjusted up to the pulse width of zero, which would not be possible by the use of only one monostable multivibrator.

Finally, the pulse 1 is employed as a gating pulse for the counting pulses appearing in the count frequency oscillator 49, for which purpose the AND-circuit 103 is provided with both the gating pulse and the counting pulses, and has its output connected to the counter 40. At the outputs 41 to 46 of the counter 40 there is then available a binary-coded number of six places.

A simplification of the circuit arrangement according to FIG. 8 will result if the logic circuits known as NAND circuits are employed, which perform an amplification and a phase reversal. By the use of suitable back-coupling, it is possible to construct an astable multivibrator with two NAND circuits, which can then replace the AND-circuits 102 and 103 as well as the count-frequency oscillator of the circuit arrangement according to FIG. 8. An analog-digital converter can then be constructed from four integrated circuits, of which one serves as a monostable multivibrator, a second as above described as a count-frequency oscillator and two further circuits serve as the counter 40.

The resetting of the counter 40 is not represented in FIGS. 7 and 8 but it may be effected, like the circuits according to FIGS. 3 and 5, by means of a pulse derived from the leading flank of the vertical-frequency pulse.

It should be recognized that NAND circuits are AND circuit means including a built-in inversion factor.

What is claimed is:

1. A method for correcting color errors in color films in connection with the generation of television signals corresponding to the films, comprising the steps of:

A. applying machine-readable markings to the films to indicate sections of film where the degree of color error present in the films might change, B. observing the color error in said sections of film and generating appropriate correction factors for each of said sections, C. recording said correction factors on a machine-readable information carrier in a manner allowing subsequent automatic association between the recorded correction factors and the corresponding machine-readable markings, D. scanning said films to generate said television signals, E. reading said machine-readable markings and said recorded correction factors at corresponding times to generate error-correction signals corresponding to the recorded correction factors, and F. correcting the color error in said television signals in accordance with said error correction signals.

2. A method according to claim 1 wherein said information carrier is a paper tape in which said correction factors are recorded as punched holes.

3. A method according to claim 1 wherein said machine-readable markings are applied to the films at the beginning of each scene.

4. A method according to claim 1 wherein said correction factors are generated as analog signals and comprising the additional step of converting said analog signals to digital signals for subsequent digital recording on said information carrier.

5. A method according to claim 1 wherein said correction factors control the maximum value, the minimum value and the gradation of each of three color value signals associated with said television signals.

6. A method according to claim 5, in which said television signals include separate luminance signals, wherein said correction factors control the minimum value and gradation of said luminance signals.

7. A method according to claim 6 wherein a further correction factor is arranged to influence the amplitude of the color value signals in the same sense with respect to each other but in the opposite sense to the maximum value of the luminance signal, whereby the overall amplitude remains constant.

8. A method according to claim 1 wherein further markings are applied to the films, comprising the steps of A. sensing an individual marking to cause stepping of the information carrier, B. sensing two markings close together to begin a second film transmission operation where the film to be transmitted is more than one reel long, and C. sensing three markings close together to stop the first film-transmission operation, completing the changeover between reels.

9. A system for correction color errors in color films in connection with means for generating television signals corresponding to the films, comprising:

A. machine-readable markings on said films for indicating sections of film where the degree of color error present in the films might change, B. means for observing the color error in said sections of film and for generating signals for providing appropriate correction factors for the television signals corresponding to each of said sections, C. means for recording said correction factors on a machine-readable information carrier in a manner allowing subsequent automatic association between the recorded factors and the corresponding machine-readable markings, D. means for scanning said films to generate said television signals, E. means for reading the machine-readable markings and the recorded correction factors at corresponding times to generate error correction signals corresponding to the recorded correction factors, and F. transmission means for correcting the color errors in said television signals in accordance with said error correction signals.

10. A system according to claim 9 wherein the means for generating correction factor signals provides analog signals and further comprising analog-to-digital conversion means synchronized by vertical-synchronizing signals associated with said television signals for converting said analog signals to digital correction factor signals during vertical-blanking intervals, and wherein the recording means records the digital correction factor signals.

11. A system according to claim 10 comprising:

A. sawtooth generator means having a sync-input terminal and an output terminal, B. means for delivering vertical-frequency pulses to the sync-input terminal, C. first and second comparator means, each having first and second input terminals, each first input terminal being connected to receive a signal from the sawtooth generator means output terminal, the first comparator means second input terminal being connected to a source of constant potential, the second comparator means second input terminal being connected to receive the analog correction factor signal, each of the comparator means having a respective output terminal for providing a response at the instant when the two inputs of the respective comparator are equal, D. logic circuit means responsive to the outputs from the two comparators for generating a logic pulse having edges determined by the respective instants of response of the two comparators, E. a count-frequency oscillator for generating count pulses, F. an AND circuit having a first input connected to receive said logic pulses and a second input connected to receive said count pulses for generating a gated count-pulse output, and G. a binary counter connected to count the gated count pulses and to be reset at the beginning of vertical blanking of the television signal.

12. A system according to claim 10 comprising:

A. sawtooth generator means having a sync-input terminal and an output terminal, B. means for delivering a vertical-frequency pulse to the sync-input terminal, C. comparator means having first and second input terminals for comparing the output from the sawtooth generator means output terminal with the analog correction factor signals to provide a comparator output, D. count-frequency oscillator means for providing a count-frequency signal, E. a binary counter, and F. gate means responsive to the comparator output to connect the count-frequency signal to the binary counter only during the time from the beginning of the sawtooth up to the time when the comparator output indicates equality between input signals.

13. A system according to claim 12 further comprising:

A. a second counter, and

B. a second gate circuit for receiving gated count-frequency pulses and connected to provide the second counter with only so many of the pulses as received as the counter can receive without returning to the counter zero position.

14. A system according to claim 10 comprising:

A. sawtooth generator means having a sync-input terminal and an output terminal, B. means for delivering vertical-frequency pulses to the sync-input terminal to cause the sawtooth signal on the sawtooth generator output terminal to progress linearly with respect to time during the vertical-frequency blanking interval, C. a count-frequency oscillator for providing a count-frequency signal, D. a modulating circuit connected to receive the sawtooth signal and the count-frequency signal for generating a modulation signal corresponding to the product of the two received signals, E. a threshold circuit responsive to the modulation signal and preset by the correction factor to generate a threshold output signal, and F. counter means responsive to the threshold output signal for counting pulses from the count-frequency signal when the modulation signal reaches the threshold value.

15. A system according to claim 10 further comprising:

A. a monostable multivibrator means having its unstable condition controlled by the correction factor signals and receiving the vertical-synchronizing signals at its input to generate a multivibrator output signal, B. first AND-circuit means responsive to the multivibrator output signal and to the vertical-synchronizing signals for providing a first AND output signal, C. a source of count pulses, D. second AND circuit means responsive to the first AND output signal and to the count pulses for providing a second AND output signal, and E. counting means for counting pulses in said second AND output signal.

16. A system according to claim 11 further comprising gate circuit means connected to the input of the counter for permitting counting of the input pulses only during periods of vertical blanking.

17. A system according to claim 12 further comprising gate circuit means connected to the input of the counter for permitting counting of the input pulses only during periods of vertical blanking.

18. A system according to claim 10 wherein said transmission means comprises:

voltage dividers having an upper and a lower partial resistance, at least one of which partial resistances comprises A. a series circuit of resistances, B. a plurality of electronic switches paralleling respective ones of said resistances, and C. a plurality of control means responsive to the digital correction factor signals for operating the respective said switches.

19. A system according to claim 18 wherein the first and second partial resistances are joined at one end of each to form a junction point, wherein first and second signals to be blended in are applied to the respective other ends of the first and second partial resistances, a resulting signal from the junction point providing the output of the voltage dividers in such a manner that the overall resistance values of the first and the second partial resistances are oriented in mutually opposite senses.

20. A system according to claim 9 wherein the means for generating correction factor signals provides analog signals and further comprising nonsynchronized analog-to-digital conversion means associated with said television signals for converting said analog signals to digital correction factor signals, gate circuit means connecting the output of said analog-to-digital conversion means to intermediate storage means during the vertical-blanking interval.

* * * * *